United States Patent Office 3,496,701
Patented Feb. 24, 1970

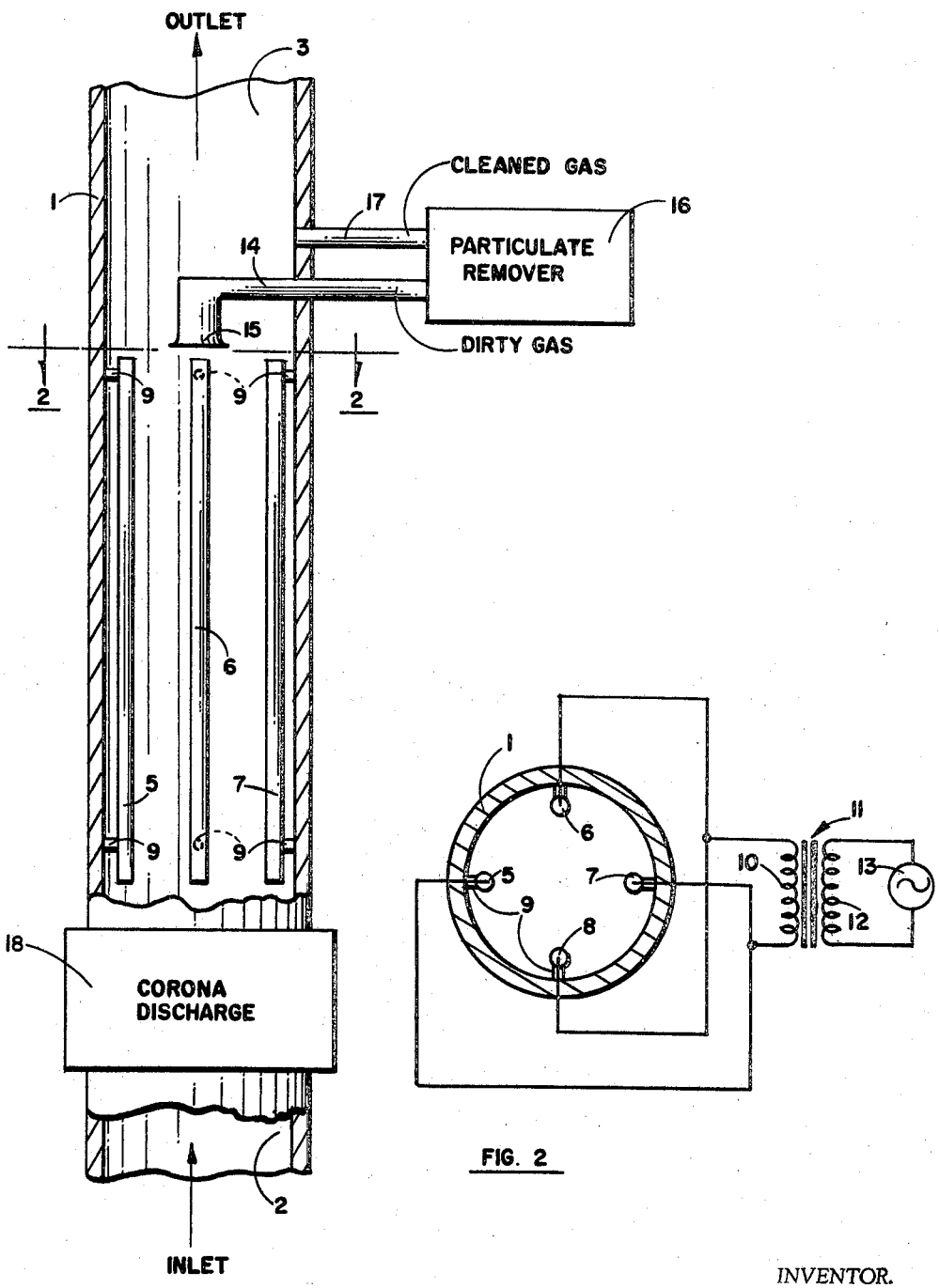

3,496,701
METHOD AND APPARATUS FOR REMOVING PARTICULATES FROM FLOWING GASES
T. G. Owe Berg, 14361 Deanann Place,
Garden Grove, Calif. 92640
Filed Dec. 13, 1967, Ser. No. 690,126
Int. Cl. B03c 3/06, 3/02
U.S. Cl. 55—6                8 Claims

ABSTRACT OF THE DISCLOSURE

Particulates are removed from gases flowing through a duct by concentrating the particulates within a narrow region of the duct and treating the gas flowing in this region. The concentration of the particulates within a narrow region is accomplished by a non-uniform alternating electric field within the duct.

BACKGROUND OF THE INVENTION

Field of the invention

The present invention relates to a method and apparatus for the removal of particulates from flowing gases and, more specifically, to such a method and apparatus that concentrate the particulates within a narrow region of the cross section of the flowing gas so that only the portion of the gas within the narrow region requires treatment for the removal of the particulates.

Description of the prior art

The physical separation and removal of particulates from flowing gases in which they are suspended is often required for one or more of several reasons. As examples, such separation may be required: (1) to collect a product which has been processed or handled in gas suspension, as in spray-drying or pneumatic conveying; (2) to recover a valuable product inadvertently mixed with processing gases, as in kiln or smelter exhausts; (3) to eliminate a nuisance, as in fly-ash removal; (4) to reduce equipment maintenance, as in engine intake air filters; (5) to eliminate a health, fire explosion, or safety hazard, as in bagging operations or nuclear separations plant ventilation air; and (6) to improve product quality, as in cleaning of air used in processing pharmaceutical or photographic products.

Generally, all particle collection systems existing today depend upon subjecting the suspended particles to some force which will drive them to a collecting surface or surfaces. The known mechanisms by which such deposition can occur may be classed as gravitational, inertial, physical or barrier, electrostatic, molecular or diffusional, and thermal or radiant. However, the removal of particulates from flowing gases by these conventional methods requires the treatment of large quantities of gas. Generally, the entire quantity of gas must be treated, resulting in the processing equipment being large and expensive. For example, in a cyclone separator, one of the most widely used types of dust collectors, the entire volume of gas enters a conical or cylindrical chamber tangentially and leaves axially. Because of the change of directions, the particulates are flung to the outer wall from which they slide into a receiving bin or into a conveyor while the gases whirl around to the central exit port. However, because of the fact that the cyclone separator operates on the entire volume of gas, for large air handling capacities, an arrangement of multiple small diameter units in parallel is often required to attain high collection efficiencies. This also results in high costs since the original capital outlay and the operating expenses are a function of the volume of gas to be treated. The same applies to the other conventional methods mentioned.

SUMMARY OF THE INVENTION

According to the present invention, there is provided a novel method and apparatus for the efficient separation and removal of particulates from flowing gases. This is achieved by concentrating the particulates within a narrow region of the cross section of the flowing gas, e.g. in the center of the stream. In this manner, only the portion of the gas within the narrow region requires treatment for the removal of the particulates.

The present invention is based upon the known principle that charged particulates can be confined in a non-uniform alternating electric field. Therefore, the use of such a field in connection with a pipe, duct, or smokestack containing contaminated gases can operate to concentrate the particulates in the center of the gas stream. The central portion of the gas stream may be passed through any known dust collection device for the removal of the particulates.

OBJECTS

It is, therefore, an object of the present invention to provide a novel method for the separation and removal of particulates from flowing gases in which they are suspended.

It is a further object of the present invention to provide a method for the removal of particulates from flowing gases by concentrating the particulates within a narrow region of the cross section of the flowing gas and treating the narrow region.

It is a still further object of the present invention to provide a method for the removal of particulates from flowing gases which uses a non-uniform alternating electric field to concentrate the particulates within a narrow region of the cross section of the flowing gas.

It is another object of the present invention to provide novel apparatus for the separation and removal of particulates from flowing gases in which they are suspended.

It is still another object of the present invention to provide apparatus for the removal of particulates from flowing gases which concentrates the particulates within a narrow region of the cross section of the flowing gas and treats the narrow region.

Another object of the present invention is the provision of apparatus for the removal of particulates from flowing gases in which a non-uniform alternating electric field is utilized to concentrate the particulates within a narrow region of the cross section of the flowing gas.

Still other objects, features, and attendant advantages of the present invention will become apparent to those skilled in the art from a reading of the following detailed description of a preferred embodiment constructed in accordance therewith, taken in conjunction with the accompanying drawings wherein like numerals represent like parts in the several figures and wherein:

BRIEF DESCRIPTION OF THE DRAWINGS

FIGURE 1 is a cross sectional view of a pipe, duct, smokestack or other conduit that contains flowing gases to be cleaned showing, partially in block diagram form, the manner in which the present invention operates to remove the particulates; and FIGURE 2 is a view taken along lines 2—2 of FIG. 1 showing the electrical circuitry of the present invention.

DESCRIPTION OF THE PREFERRED EMBODIMENT

Referring now to the drawings and, more particularly, to FIGURE 1 thereof, there is shown a cross sectional view of a pipe, duct, smokestack or any other conduit 1 that contains the flowing gas to be cleaned. Duct 1 may be cylindrical or rectangular or any other suitable shape. Duct 1 has an inlet 2 for receiving the gas to be cleaned and an outlet 3 through which the cleaned gas exhausts. In the preferred form of the invention, four rod-shaped electrodes 5, 6, 7 and 8, the latter not being shown in FIGURE 1, are placed in duct 1. Electrodes 5-8 may be supported within duct 1 by any suitable type of insulating support members 9.

Referring now to FIGURE 2, which shows a cross sectional view of the duct of FIGURE 1 taken along lines 2—2 thereof, it is seen that electrodes 5-8 are spaced at 90° intervals within the circumference of duct 1. Electrodes 5-8 are connected in pairs, electrodes 5 and 7 being connected together and electrodes 6 and 8 being connected together. Electrodes 5 and 7 are connected to one end of a secondary 10 of a transformer 11. Similarly, electrodes 6 and 8 are connected to the other end of secondary 10. The primary 12 of transformer 11 is connected to a suitable source 13 of alternating current.

The present invention is based upon the known principle that charged particles can be confined in a non-uniform alternating electric field. Such a field is generated by the electrode configuration shown in FIGURE 2. Although other configurations are possible for generating a non-uniform alternating electric field, the configuration of FIGURE 2 is desirable because a point of zero potential and zero electric field exists in the center of duct 1 and therefore the particulates will concentrate at that point. By concentrating the particulates within a narrow region of the cross section of the flowing gas in the center of duct 1, only the central portion of the gas stream within duct 1 needs to be treated. As shown in FIGURE 1, this treatment may be achieved by providing a duct 14 within duct 1, duct 14 having an opening 15 located in the center of the stream of flowing gas within duct 1. Duct 14 may lead to a conventional type of particulate remover 16, such as a cyclone, scrubber or electrostatic precipitator. The cleaned gas exciting from particulate remover 16 may be conducted back to duct 1 via a duct 17 for passage through outlet 3 of duct 1.

In practice, it is generally found that most particulates are sufficiently charged to be concentrated in the manner described above without requiring external apparatus for charging. However, in the event that the natural charge on the particulates does not suffice, charging can be effected by means of a corona discharge 18 or any other known device for charging particles. Corona discharge 18 would be located within the inlet portion 2 of duct 1 as shown in FIGURE 1.

It can now be appreciated that in accordance with the present invention there is provided a novel method and apparatus for the efficient physical separation and removal of particulates from flowing gases in which they are suspended. By concentrating the particulates within a narrow region of the flowing gas, e.g. in the center of the stream, only that portion of the gas requires treatment for the removal of the particulates. Since the total quantity of particulates is concentrated within a small volume of gas, high collection efficiencies may be attained.

While the invention has been described with respect to the preferred physical embodiment constructed in accordance therewith, it will be apparent to those skilled in the art that various modifications and improvements may be made without departing from the scope and spirit of the invention. For example, although a configuration of four electrodes spaced at 90° intervals around a duct in conjunction with a transformer and an A.C. source has been shown for generating a non-uniform alternating electric field, it is obvious that other well known arrangements for accomplishing the same result may be used. Also, it will be apparent to those skilled in the art that the cleaned gas exiting from the particulate remover need not be conducted back to the duct outlet but may be exhausted directly to the atmosphere or any other location. Finally, although a configuration has been disclosed in which the entire volume of gas in the duct is treated with a single electric field, it will be apparent that the duct may be partitioned into several channels and the gas in each channel treated separately.

I claim:
1. A method for separating and removing particulates from a gas flowing through a duct comprising the steps of:
   providing a non-uniform, alternating, electric field within said duct by:
      positioning a plurality of electrodes in said duct at spaced apart intervals around the circumference thereof, at least one of said electrodes being electrically insulated from said duct;
      providing a source of A.C. voltage having first and second output terminals;
      connecting said first output terminal to said at least one of said electrodes; and
      connecting said second output terminal to at least one other of said electrodes, generating said non-uniform, alternating, electric field between said electrodes, concentrating said particulates within a relatively narrow region of the cross-section of said flowing gas by using said non-uniform, alternating, electric field to migrate said particulates into said relatively narrow region, said region being spaced from and not on any electrode; and
   processing said relatively narrow region of gas by removing said particulates therefrom.

2. The method of claim 1 wherein said particulates are confined in the center of said flowing gas.

3. The method of claim 1 further comprising the step of:
   charging said particulates before subjecting said particulates to said non-uniform alternating electric field.

4. Apparatus for the separation and removal of particulates from gases flowing through a duct comprising:
   means for generating a non-uniform, alternating, electric field within said duct, said means comprising:
      a plurality of electrodes positioned in said duct at spaced apart intervals around the circumference thereof;
      means for electrically insulating at least one of said electrodes from said duct; and
      a source of A.C. voltage having first and second output terminals, said first output terminal being connected to said at least one of said electrodes, and said second output terminal being connected to at least one other of said electrodes, said source and said electrodes generating said non-uniform, alternating electric field substantially between said electrodes, said field causing said particulates to be concentrated within a relatively narrow region of the cross-section of said flowing gas, said region being spaced from and not on any electrode; and
   particulate removal and treating means constructed and arranged for treating said relatively narrow region of gas for removing said particulates from said relatively narrow region of gas.

5. The apparatus of claim 4 wherein said relatively narrow region is in the center of said duct.

6. The apparatus of claim 4 further comprising:
   means for charging said particulates before they are subjected to said electric field.

7. The apparatus of claim 4 wherein said means for generating a non-uniform, alternating, electric field within said duct comprises:
   four elongated electrodes positioned in said duct at 90° intervals around the circumference thereof; and
   means for connecting opposite electrodes in pairs; and wherein:
      said first output terminal of said source of A.C. voltage is connected to one of said pairs of electrodes, and said second output terminal is connected to the other of said pairs of electrodes.

8. The apparatus of claim 4 wherein said particulate removal and treating means for treating said relatively narrow region of gas for removing said particulates comprises:
- a conduit means having a diameter which is smaller than the diameter of said duct, said conduit means having an opening within said duct which is perpendicular to the direction of flow of said gases, said opening being aligned with said relatively narrow region of the cross-section of said flowing gas.

References Cited

UNITED STATES PATENTS

| | | | |
|---|---|---|---|
| 2,451,755 | 8/1947 | Lee | 55—343 |
| 2,578,003 | 12/1951 | Garbo | 302—66 |
| 2,582,903 | 1/1952 | Guanella et al. | 204—312 |
| 2,836,750 | 5/1958 | Weimer | 313—63 |
| 2,867,285 | 1/1959 | Wintermute | 55—124 X |
| 3,011,543 | 12/1961 | McCormick | 159—4 |
| 3,113,427 | 12/1963 | Meyer | 60—35.5 |
| 3,184,901 | 5/1965 | Main | 55—154 X |
| 3,266,783 | 8/1966 | Knight | 261—1 |
| 3,279,253 | 10/1966 | Blackmon et al. | 310—2 X |

OTHER REFERENCES

Pohl, Herbert A.: "Non-uniform Electric Fields," Scientific American, vol. 203, No. 6, December 1960, pp. 107–116.

HARRY B. THORNTON, Primary Examiner

D. E. TALBERT, Assistant Examiner

U.S. Cl. X.R.

55—123, 124, 139, 146, 151, 431; 73—28; 137—1; 204—180, 186, 299, 302, 312; 310—2